United States Patent
Qian et al.

(10) Patent No.: US 10,548,140 B2
(45) Date of Patent: Jan. 28, 2020

(54) FLEXIBLE LOAD DISTRIBUTION AND MANAGEMENT IN AN MME POOL

(71) Applicant: Affirmed Networks, Inc., Acton, MA (US)

(72) Inventors: Haibo Qian, Frisco, TX (US); Fred Rink, Fairview, TX (US); Bret Bieghler, Plano, TX (US)

(73) Assignee: AFFIRMED NETWORKS, INC., Acton, MA (US)

( * ) Notice: Subject to any disclaimer, the term of this patent is extended or adjusted under 35 U.S.C. 154(b) by 0 days.

(21) Appl. No.: 15/968,440

(22) Filed: May 1, 2018

(65) Prior Publication Data

US 2018/0324784 A1 Nov. 8, 2018

Related U.S. Application Data

(60) Provisional application No. 62/500,093, filed on May 2, 2017.

(51) Int. Cl.
 *H04W 72/04* (2009.01)
 *H04W 36/22* (2009.01)
 *H04W 28/02* (2009.01)

(52) U.S. Cl.
 CPC ......... *H04W 72/048* (2013.01); *H04W 36/22* (2013.01); *H04W 72/0486* (2013.01); *H04W 28/0215* (2013.01); *H04W 28/0236* (2013.01)

(58) Field of Classification Search
 CPC ... H04W 72/048; H04W 28/08; H04W 36/22; H04W 72/0486; H04W 28/0236; H04W 28/0215
 See application file for complete search history.

(56) References Cited

U.S. PATENT DOCUMENTS 8,428,610 B2 * 4/2013 Chowdhury ........ H04L 41/0896
455/453
8,477,730 B2 7/2013 Rajagopalan et al.
(Continued)

FOREIGN PATENT DOCUMENTS

CN 101093590 A 12/2007
CN 102390184 A 3/2012
(Continued)

OTHER PUBLICATIONS

3GPP TS 23.236 v12.0.0 (Jun. 2013); "3rd Generation Partnership Project; Technical Specification Group Services and System Aspects; Intra-domain connection of Radio Access Network (RAN) nodes to multiple Core Network (CN) nodes (Release 12)", 3GPP Organizational Partners, Valbonne, France, Jun. 2013 (40 pages).
(Continued)

*Primary Examiner* — Ian N Moore
*Assistant Examiner* — Rushil Parimal Sampat
(74) *Attorney, Agent, or Firm* — Wilmer Cutler Pickering Hale and Dorr LLP

(57) ABSTRACT

Systems and methods are disclosed for a method of assigning resources to eNodeBs in a mobility management entity (MME) pool, including determining a first relative capacity for a first eNodeB based on at least one of latency between the first eNodeB and a first MME and the location of the first eNodeB. A second relative capacity may be determined for a second eNodeB based on at least one of latency between the second eNodeB and the first MME and the location of the second eNodeB. The first and second relative capacities may be indicative of relative capacity values greater than zero. The relative capacities may be provided to the first and second eNodeBs, and a portion of traffic sent from the first and second eNodeBs to the first MME may be based on the first and second relative capacities, respectively.

16 Claims, 6 Drawing Sheets

(56) References Cited

U.S. PATENT DOCUMENTS

| | | | |
|---|---|---|---|
| 8,509,200 | B2 | 8/2013 | Li et al. |
| 8,522,241 | B1 | 8/2013 | Vohra et al. |
| 8,565,070 | B2 | 10/2013 | Harper et al. |
| 8,855,051 | B2 | 10/2014 | Suh et al. |
| 8,995,262 | B2 * | 3/2015 | Chowdhury ........ H04L 41/0896 370/230 |
| 9,013,993 | B2 | 4/2015 | Logan et al. |
| 9,185,595 | B2 | 11/2015 | Qu |
| 9,294,981 | B2 | 3/2016 | Rajagopalan et al. |
| 9,300,623 | B1 | 3/2016 | Earl et al. |
| 9,578,541 | B2 * | 2/2017 | Seenappa .......... H04W 28/0236 |
| 9,985,875 | B1 | 5/2018 | Srinath et al. |
| 2002/0007468 | A1 | 1/2002 | Kampe et al. |
| 2002/0062388 | A1 | 5/2002 | Ogier et al. |
| 2003/0171114 | A1 | 9/2003 | Hastings |
| 2003/0187982 | A1 | 10/2003 | Petit |
| 2004/0131023 | A1 | 7/2004 | Auterinen |
| 2005/0136832 | A1 | 6/2005 | Spreizer |
| 2006/0008063 | A1 | 1/2006 | Harnesk et al. |
| 2006/0168655 | A1 | 7/2006 | Grandmaitre et al. |
| 2006/0195607 | A1 | 8/2006 | Naseh et al. |
| 2006/0294238 | A1 | 12/2006 | Naik et al. |
| 2007/0168058 | A1 | 7/2007 | Kephart et al. |
| 2007/0297400 | A1 | 12/2007 | Cameron et al. |
| 2008/0014961 | A1 | 1/2008 | Lipps et al. |
| 2008/0162984 | A1 | 7/2008 | Kalra et al. |
| 2008/0240082 | A1 | 10/2008 | Feldman et al. |
| 2009/0109845 | A1 | 4/2009 | Andreasen et al. |
| 2009/0124284 | A1 | 5/2009 | Scherzer et al. |
| 2009/0300173 | A1 | 12/2009 | Bakman et al. |
| 2010/0050172 | A1 | 2/2010 | Ferris |
| 2010/0128708 | A1 | 5/2010 | Liu et al. |
| 2010/0238840 | A1 | 9/2010 | Lu et al. |
| 2010/0281151 | A1 | 11/2010 | Ramankutty et al. |
| 2010/0317331 | A1 | 12/2010 | Miller |
| 2011/0131338 | A1 | 6/2011 | Hu |
| 2011/0211583 | A1 | 9/2011 | Seetharaman et al. |
| 2011/0235505 | A1 | 9/2011 | Eswara et al. |
| 2011/0258433 | A1 | 10/2011 | Pulini et al. |
| 2011/0269499 | A1 | 11/2011 | Vikberg et al. |
| 2012/0023360 | A1 | 1/2012 | Chang et al. |
| 2012/0030349 | A1 | 2/2012 | Sugai |
| 2012/0106349 | A1 | 5/2012 | Adjakple et al. |
| 2012/0144226 | A1 | 6/2012 | Yang et al. |
| 2012/0177005 | A1 | 7/2012 | Liang et al. |
| 2012/0190331 | A1 | 7/2012 | Ahmed et al. |
| 2012/0207104 | A1 | 8/2012 | Liang et al. |
| 2012/0236708 | A1 | 9/2012 | Kompella et al. |
| 2012/0282937 | A1 | 11/2012 | He et al. |
| 2013/0007286 | A1 | 1/2013 | Mehta et al. |
| 2013/0054789 | A1 | 2/2013 | Bajamahal |
| 2013/0094395 | A1 | 4/2013 | Lopez et al. |
| 2013/0100815 | A1 | 4/2013 | Kakadia et al. |
| 2013/0121298 | A1 | 5/2013 | Rune et al. |
| 2013/0173804 | A1 | 7/2013 | Murthy et al. |
| 2013/0188555 | A1 | 7/2013 | Olsson et al. |
| 2013/0212205 | A1 | 8/2013 | Flockhart et al. |
| 2013/0231080 | A1 | 9/2013 | Cheuk et al. |
| 2013/0286821 | A1 | 10/2013 | Liu |
| 2013/0308604 | A1 | 11/2013 | Jiang et al. |
| 2014/0047282 | A1 | 2/2014 | Deb et al. |
| 2014/0098671 | A1 | 4/2014 | Raleigh et al. |
| 2014/0133464 | A1 | 5/2014 | Li et al. |
| 2014/0148165 | A1 * | 5/2014 | Serravalle ............. H04W 16/14 455/436 |
| 2014/0160938 | A1 | 6/2014 | Qu |
| 2014/0221025 | A1 | 8/2014 | Chandramouli et al. |
| 2014/0359041 | A1 | 12/2014 | Bai |
| 2015/0018131 | A1 | 1/2015 | Siefker |
| 2015/0050924 | A1 | 2/2015 | Gotou |
| 2015/0181431 | A1 | 6/2015 | Zheng et al. |
| 2015/0201364 | A1 | 7/2015 | Yamada et al. |
| 2015/0215768 | A1 | 7/2015 | Dong et al. |
| 2015/0237539 | A1 | 8/2015 | Guo |
| 2015/0271255 | A1 | 9/2015 | Mackay et al. |
| 2015/0280927 | A1 | 10/2015 | Liang et al. |
| 2015/0334615 | A1 | 11/2015 | Zhang et al. |
| 2016/0028607 | A1 | 1/2016 | Weill et al. |
| 2016/0029278 | A1 | 1/2016 | Poikonen et al. |
| 2016/0135143 | A1 | 5/2016 | Won et al. |
| 2016/0270142 | A1 | 9/2016 | Olsson et al. |
| 2016/0285923 | A1 | 9/2016 | Kodaypak |
| 2016/0337841 | A1 | 11/2016 | Won et al. |
| 2016/0353325 | A1 | 12/2016 | Poikonen |
| 2017/0127324 | A1 | 5/2017 | Liang et al. |
| 2017/0142762 | A1 | 5/2017 | Kedalagudde et al. |
| 2017/0257810 | A1 | 9/2017 | Gandhi |
| 2018/0049156 | A1 | 2/2018 | Laha et al. |
| 2018/0077714 | A1 | 3/2018 | Kodaypak et al. |
| 2018/0139797 | A1 | 5/2018 | Chun et al. |
| 2018/0192234 | A1 | 7/2018 | Mohamed et al. |
| 2018/0248711 | A1 | 8/2018 | McCann |
| 2018/0332636 | A1 | 11/2018 | Lu et al. |

FOREIGN PATENT DOCUMENTS

| | | |
|---|---|---|
| CN | 102555536 A | 7/2012 |
| CN | 2029655250 U | 6/2013 |
| CN | 203311505 U | 11/2013 |
| EP | 1011974 A1 | 6/2000 |
| EP | 1518352 B1 | 8/2007 |
| EP | 2200369 A2 | 6/2010 |
| EP | 2709385 A1 | 3/2014 |
| GB | 2409368 A | 6/2005 |
| JP | 2002-319963 A | 10/2002 |
| JP | 2006-501781 A | 1/2006 |
| JP | 2010-88013 | 4/2010 |
| JP | 2011-508474 A | 3/2011 |
| JP | 2011-259440 A | 12/2011 |
| KR | 10-2010-0070691 A | 6/2010 |
| WO | WO-2004004216 | 1/2004 |
| WO | WO-2010066430 A1 | 6/2010 |
| WO | WO-2013143831 A1 | 10/2013 |
| WO | WO-2016206118 A1 | 12/2016 |
| WO | WO-2017004158 A1 | 1/2017 |
| WO | WO-2017076088 A1 | 5/2017 |
| WO | WO-2017197589 A1 | 11/2017 |

OTHER PUBLICATIONS

3GPP TS 23.236 v13.0.0 (Jun. 2015); "3rd Generation Partnership Project; Technical Specification Group Services and System Aspects; Intra-domain connection of Radio Access Network (RAN) nodes to multiple Core Network (CN) nodes (Release 13)", 3GPP Organizational Partners, Valbonne, France, Jun. 2015 (41 pages).

3GPP TS 23.401 V13.9.0 (Dec. 2016), "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne, France, Dec. 2016 (374 pages).

International Search Report and Written Report issued by the U.S. Patent and Trademark Office as International Searching Authority, issued in PCT/US17/017913, dated Mar. 13, 2017 (14 pages).

3GPP TR 21.905 v13.1.0 (Jun. 2016), "3rd Generation Partnership Project; Technical Specification Group Services and System Aspects; Vocabulary for 3GPP Specifications (Release 13)", Valbonne, France, Jun. 2016 (65 pages).

3GPP TR 21.905 v15.0.0 (Mar. 2018), "3rd Generation Partnership Project; Technical Specification Group Services and System Aspects; Vocabulary for 3GPP Specifications (Release 15)", Valbonne, France, Mar. 2018 (65 pages).

3GPP TR 23.714 V.14.0.0 (Jun. 2016), "3rd Generation Partnership Project; Technical Specification Group Services and System Aspects; Study on control and user plane separation of EPC nodes (Release 14)"; Valbonne, France, Jun. 2016 (87 pages).

3GPP TR 23.722 v0.1.1 (Apr. 2017), "3rd Generation Partnership Project; Technical Specification Group Services and System Aspects; Study on Common API Framework for 3GPP Northbound APIs (Release 15)", Valbonne, France, Apr. 2017 (20 pages).

(56) References Cited

OTHER PUBLICATIONS

3GPP TS 23.040 v13.2.0 (Sep. 2016), "3rd Generation Partnership Project; Technical Specification Group Core Network and Terminals; Technical realization of the Short Message Service (SMS) (Release 13)", Valbonne, France, Sep. 2016 (214 pages).
3GPP TS 23.204 v13.1.0 (Jun. 2016), "3rd Generation Partnership Project; Technical Specification Group Services and Systems Aspects; Support of Short Message Service (SMS) over generic 3GPP Internet Protocol (IP) access; Stage 2 (Release 13)", Valbonne, France, Jun. 2016 (59 pages).
3GPP TS 23.214 V14.5.0 (Dec. 2017), "3rd Generation Partnership Project; Technical Specification Group Services and System Aspects; Architecture enhancements for control and user plane separation of EPC nodes; Stage 2 (Release 14)", Valbonne, France, Dec. 2017 (84 pages).
3GPP TS 23.401v13.5.0 (Dec. 2015), "3rd Generation Partnership Project: Technical Specification Group Services and System Aspects; General Packet Radio Service (GPRS) Enhancements for Evolved Universal Terrestrial Radio Access Network (E-UTRAN) Access (Release 13)", 3GPP Organizational Partners, Valbonne France, Dec. 2015 (337 pages).
3GPP TS 23.682 v. 15.5.0 (Jun. 2018),"3rd Generation Partnership Project; Technical Specification Group Services and System Aspects; Architecture enhancements to facilitate communications with packet data networks and applications (Release 15)", Valbonne, France, Jun. 2018 (125 pages).
3GPP TS 23.682 v.13.11.0 (Jun. 2018); "3rd Generation Partnership Project; Technical Specification Group Services and System Aspects; Architecture Enhancements to facilitate communications with packet data networks and applications (Release 13)"; Valbonne, France, Jun. 2018 (93 pages).
3GPP TS 23.682 v13.9.0 (Jun. 2017), "3rd Generation Partnership Project; Technical Specification Group Services and System Aspect; Architecture enhancements to facilitate communications with packet data networks and applications (Release 13)", Valbonne, France, Jun. 2017 (93 pages).
3GPP TS 23.682 v14.3.0 (Mar. 2017), "3rd Generation Partnership Project; Technical Specification Group Services and System Aspects; Architecture enhancements to facilitate communications with packet data networks and applications (Release 14)", Valbonne, France, Mar. 2017 (106 pages).
3GPP TS 29.128 v13.3.0 (Dec. 2016), "3rd Generation Partnership Project; Technical Specification Group Core Network and Terminals; Mobility Management Entity (MME) and Serving GPRS Support Node (SGSN) interfaces for interworking with packet data networks and applications (Release 13)", Valbonne, France, Dec. 2016 (47 pages).
3GPP TS 29.338 v13.3.0 (Dec. 2016), "3rd Generation Partnership Project; Technical Specification Group Core Network and Terminals; Diameter based protocols to support Short Message Service (SMS) capable Mobile Management Entities (MMEs) (Release 13)", Valbonne, France, Dec. 2016 (50 pages).
3GPP, "Universal Mobile Telecommunications System (UMTS); UTRAN Overall Description (3GPP TS 25.401 version 12.0.0 Release 12)", ETSI TS 125 401 v12.0.0 (Oct. 2014); European Telecommunications Standards Institute, Oct. 2014, pp. 1-64 (65 pages).

Apple, 3GPP Draft, "A Solution of Network Slice Instance Selection and Association", Temporary Document, Sa WG2 Meeting #S2-116BIS, S2-165127, Aug. 29-Sep. 2, 2016, Sanya, PR China, Sep. 2016 (5 pages).
Cisco Systems, "Deployment Guide: CISCO IOS IPSEC High Availability", 2005, accessed http://www.cisco.com/en/US/technologies/tk583/tk372/technologies_white_paper0900aecd80278edf.pdf, retrieved Jul. 26, 2018 (16 pages).
European Extended Search Report issued in EP16882635.2. dated Jul. 17, 2019 (13 pages).
Extended European Search Report issued by the European Patent Office for European Patent Application No. 12825827.4 dated Mar. 6, 2015 (7 pages).
Extended European Search Report issued in European Patent Application No. 16762501.1, dated Oct. 30, 2018 (11 pages).
Giust, F. et al., "ETSI: MEC Deployments in 4G and Evolution Towards 5G", ETSI White Paper No. 24, First Edition, ISBN No. 979-10-92620-18-4, Feb. 2018 (24 pages).
Horak, R., Excerpt from "Internet Protocols", in Telecommunications and Data Communications Handbook, John Wiley & Sons, pp. 663-664, Aug. 2007 (2 pages).
International Search Report and Written Opinion issued by the European Patent Office as International Searching Authority in International Application No. PCT/US2018/035345, dated Aug. 13, 2018 (19 pages).
International Search Report and Written Opinion issued by the European Patent Office as International Searching Authority in International Application No. PCT/US2018/031423, dated Oct. 9, 2018 (18 pages).
International Search Report and Written Opinion issued by the European Patent Office as International Searching Authority in International Application No. PCT/US2019/018666, dated Jul. 10, 2019 (26 pages).
International Search Report and Written Opinion issued by the European Patent Office as International Searching Authority, issued in International Application No. PCT/USI9/23138, dated May 29, 2019 (16 pages).
International Search Report and Written Opinion issued by the U.S. Patent and Trademark Office as International Searching Authority for International Application No. PCT/US12/21520 dated May 8, 2012 (8 pages).
International Search Report and Written Opinion issued by the U.S. Patent and Trademark Office as International Searching Authority for International Patent Application No. PCT/USI6/21744 dated Jun. 9, 2016 (8 pages).
International Search Report and Written Opinion issued by the U.S. Patent and Trademark Office as Searching Authority, issued in International Application PCT/US16/69092, dated Mar. 29, 2017 (15 pages).
International Search Report and Written Opinion received for PCT Patent Application No. PCT/US12/25577, dated May 21, 2012 (7 pages).
Rodriguez, et al., "A 3GPP System Architecture Evolution Virtualized Experimentation Infrastructure for Mobility Prototyping (Invited Paper)", Proceedings of the 4th International Conference on Testbeds and Research Infrastructure for the Development of Networks & Communities, Mar. 18, 2008 (10 pages).
Taniguchi, et al., "Implementation and Evaluation of cooperative Proxy Caching System for Video Streaming Services", Technical Report of the Institute of Electronics Information and Communication engineers, IEICE, Japan, vol. 103(650):13-18, Feb. 5, 2004 (6 pages).

* cited by examiner

FLEXIBLE LOAD DISTRIBUTION AND MANAGEMENT IN AN MME POOL

CROSS REFERENCE TO RELATED APPLICATIONS

This application claims priority under 35 U.S.C. § 119(e) to U.S. Provisional Application No. 62/500,093, filed May 2, 2017, entitled "Flexible Load Distribution and Management in an MME Pool," the contents of which is incorporated herein in its entirety.

FIELD OF INVENTION

The invention generally relates to mobile communications networks and, in particular, to the increased performance and load balancing of mobile communications systems.

BACKGROUND

Mobility Management Entities ("MMEs") are network elements that handle the initial attachment and handoff of user equipment ("UE") and subscriber traffic. Multiple MMES may be included in an MME pool associated with a number of eNodeBs. Traffic must be balanced between the MMES in order to ensure that the system functions properly. Current implementations balance traffic solely based on relative traffic among MMES. Accordingly, systems may be made more flexible and performance improved by additional levels of granularity in controlling traffic in an MME pool.

SUMMARY

Systems and methods are disclosed herein for implementing eNodeB-specific relative capacity assignment. In some embodiments, a method includes assigning resources to eNodeBs in a mobility management entity (MME) pool, including determining a first relative capacity for a first eNodeB based on at least one of latency between the first eNodeB and a first MME and the location of the first eNodeB, wherein the first relative capacity is associated with a first relative capacity value being greater than zero; determining a second relative capacity for a second eNodeB based on at least one of latency between the second eNodeB and the first MME and the location of the second eNodeB, wherein the second relative capacity is associated with a second relative capacity value being greater than zero; providing the first relative capacity to the first eNodeB in a first configuration update request, wherein a portion of traffic sent from the first eNodeB to the first MME is based on the first relative capacity; and providing the second relative capacity to the second eNodeB in a second configuration update request, wherein a portion of traffic sent from the second eNodeB to the first MME is based on the second relative capacity. In some embodiments the first relative capacity value is different from the second relative capacity value. In some embodiments the method further comprises offloading the second eNodeB from the first MME at a first time, wherein the offloading includes: providing a third relative capacity to the second eNodeB in a third configuration update request, wherein the portion of traffic sent from the second eNodeB to the first MME is reduced to zero based on the third relative capacity. In some embodiments, the method further includes at the first time, the portion of traffic sent from the first eNodeB to the first MME is greater than zero. In some embodiments, the method further includes determining a third relative capacity for the first eNodeB based on at least one of latency between the first eNodeB and a second MME in a pool with the first MME and the location of the first eNodeB, wherein the third relative capacity is associated with a third relative capacity value being greater than zero; and providing the third relative capacity to the first eNodeB in a third configuration update request, wherein a portion of traffic sent from the first eNodeB to the second MME is based on the third relative capacity. In some embodiments the portion of traffic sent from the first eNodeB to the first MME is sent at the first relative capacity value based on both the first relative capacity and the second relative capacity; and the portion of traffic sent from the first eNodeB to the second MME is sent at the second relative capacity value based on both the first relative capacity and the second relative capacity. In some embodiments, the method includes determining a fourth relative capacity for the second eNodeB based on at least one of latency between the second eNodeB and the second MME and the location of the second eNodeB, wherein the fourth relative capacity is associated with a fourth relative capacity value being greater than zero; and providing the fourth relative capacity to the second eNodeB in a fourth configuration update request, wherein a portion of traffic sent from the second eNodeB to the second MME is based on the fourth relative capacity. In some embodiments, at least one of: the third relative capacity value is different from the fourth relative capacity value; the first relative capacity value is different from the third relative capacity value; and the second relative capacity value is different from the fourth relative capacity value. In some embodiments, the method further includes providing the second relative capacity to a third eNodeB in a third configuration update request, wherein: a portion of traffic sent from the third eNodeB to the first MME is based on the second relative capacity; and the third eNodeB being located less than a threshold distance from the second eNodeB. In some embodiments, the determining of the first relative capacity and the second relative capacity and the providing of the first relative capacity and the second relative capacity are performed by the first MME. In some embodiments, the method further includes receiving, by the first MME, a portion of traffic from the first eNodeB based on the first relative capacity; and receiving, by the first MME, a portion of traffic from the second eNodeB based on the second relative capacity.

In some embodiments, a system for assigning resources to eNodeBs in a mobility management entity (MME) pool includes: a processor; and a memory coupled to the processor and including computer-readable instructions that, when executed by the processor, cause the processor to: determine a first relative capacity for a first eNodeB based on at least one of latency between the first eNodeB and a first MME and the location of the first eNodeB, wherein the first relative capacity is associated with a first relative capacity value being greater than zero; determine a second relative capacity for a second eNodeB based on at least one of latency between the second eNodeB and the first MME and the location of the second eNodeB, wherein the second relative capacity is associated with a second relative capacity value being greater than zero; provide the first relative capacity to the first eNodeB in a first configuration update request, wherein a portion of traffic sent from the first eNodeB to the first MME is based on the first relative capacity; and provide the second relative capacity to the second eNodeB in a second configuration update request, wherein a portion of traffic sent from the second eNodeB to the first MME is based on the second relative capacity. In some embodiments, the first relative capacity value is different from the second relative capacity value. In some embodiments, the system further includes the processor is further caused to offload the second eNodeB from the first MME at a first time, wherein the offloading further causes the processor to provide a third relative capacity to the second eNodeB in a third configuration update request, wherein the portion of traffic sent from the second eNodeB to the first MME is reduced to zero based on the third relative capacity. In some embodiments, the processor is further caused to: determine a third relative capacity for the first eNodeB based on at least one of latency between the first eNodeB and a second MME in a pool with the first MME and the location of the first eNodeB, wherein the third relative capacity is associated with a third relative capacity value being greater than zero; and provide the third relative capacity to the first eNodeB in a third configuration update request, wherein a portion of traffic sent from the first eNodeB to the second MME is based on the third relative capacity. In some embodiments, the processor is further caused to: determine a fourth relative capacity for the second eNodeB based on at least one of latency between the second eNodeB and the second MME and the location of the second eNodeB, wherein the fourth relative capacity is associated with a fourth relative capacity value being greater than zero; and provide the fourth relative capacity to the second eNodeB in a fourth configuration update request, wherein a portion of traffic sent from the second eNodeB to the second MME is based on the fourth relative capacity. In some embodiments, the portion of traffic sent from the first eNodeB to the first MME is sent at the first relative capacity value based on both the first relative capacity and the second relative capacity; and the portion of traffic sent from the first eNodeB to the second MME is sent at the second relative capacity value based on both the first relative capacity and the second relative capacity. In some embodiments, at least one of: the third relative capacity value is different from the fourth relative capacity value; the first relative capacity value is different from the third relative capacity value; and the second relative capacity value is different from the fourth relative capacity value. In some embodiments, the processor is further caused to provide the second relative capacity to a third eNodeB in a third configuration update request, wherein: a portion of traffic sent from the third eNodeB to the first MME is based on the second relative capacity; and the third eNodeB being located less than a threshold distance from the second eNodeB. In some embodiments, the processor is part of the first MME, wherein the first MME is further configured to: receive a portion of traffic from the first eNodeB based on the first relative capacity; and receive a portion of traffic from the second eNodeB based on the second relative capacity.

In some embodiments a method of introducing an additional mobility management entity (MME) into an MME pool includes: determining a first relative capacity for at least one first eNodeB, wherein the first relative capacity is associated with a first relative capacity value being greater than zero; determining a second relative capacity for at least one second eNodeB, wherein the second relative capacity is associated with a second relative capacity value being equal to zero; providing the first relative capacity to the at least one first eNodeB in at least one first configuration update request, wherein a portion of traffic sent from the at least one first eNodeB to the additional MME is based on the first relative capacity; and providing the second relative capacity to the at least one second eNodeB in at least one second configuration update request, wherein a portion of traffic sent from the at least one second eNodeB to the additional MME is based on the second relative capacity. In some embodiments, the at least one second eNodeB comprises a plurality of second eNodeBs. In some embodiments, the method further includes determining a third relative capacity for at least one of the plurality second eNodeBs after the providing the second relative capacity to the at least one second eNodeB, wherein the third relative capacity is associated with a third relative capacity value being greater than zero; providing the second relative capacity to the at least one of the plurality of second eNodeBs in at least one third configuration update request, wherein a portion of traffic sent from the at least one second eNodeB to the additional MME is based on the third relative capacity. In some embodiments, a portion of traffic sent from at least one other of the plurality of second eNodeBs is based on the second relative capacity while a portion of traffic from the at least one of the plurality of second eNodeBs is based on the third relative capacity.

In some embodiments, a system for introducing an additional mobility management entity (MME) into an MME pool includes: a processor; and a memory coupled to the processor and including computer-readable instructions that, when executed by the processor, cause the processor to: determine a first relative capacity for at least one first eNodeB, wherein the first relative capacity is associated with a first relative capacity value being greater than zero; determine a second relative capacity for at least one second eNodeB, wherein the second relative capacity is associated with a second relative capacity value being equal to zero; provide the first relative capacity to the at least one first eNodeB in at least one first configuration update request, wherein a portion of traffic sent from the at least one first eNodeB to the additional MME is based on the first relative capacity; and provide the second relative capacity to the at least one second eNodeB in at least one second configuration update request, wherein a portion of traffic sent from the at least one second eNodeB to the additional MME is based on the second relative capacity. In some embodiments the at least one second eNodeB comprises a plurality of second eNodeBs. In some embodiments, the processor is further caused to: determine a third relative capacity for at least one of the plurality second eNodeBs after the providing the second relative capacity to the at least one second eNodeB, wherein the third relative capacity is associated with a third relative capacity value being greater than zero; provide the second relative capacity to the at least one of the plurality of second eNodeBs in at least one third configuration update request, wherein a portion of traffic sent from the at least one second eNodeB to the additional MME is based on the third relative capacity. In some embodiments, a portion of traffic sent from at least one other of the plurality of second eNodeBs is based on the second relative capacity while a portion of traffic from the at least one of the plurality of second eNodeBs is based on the third relative capacity.

The various embodiments discussed above and herein may be combined in various ways, including replacing and adding steps or elements with additional listed steps or elements.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

For a more complete understanding of various embodiments of the disclosed subject matter, reference is now made to the following descriptions taken in connection with the accompanying drawings, in which.

DETAILED DESCRIPTION

Figure 1:
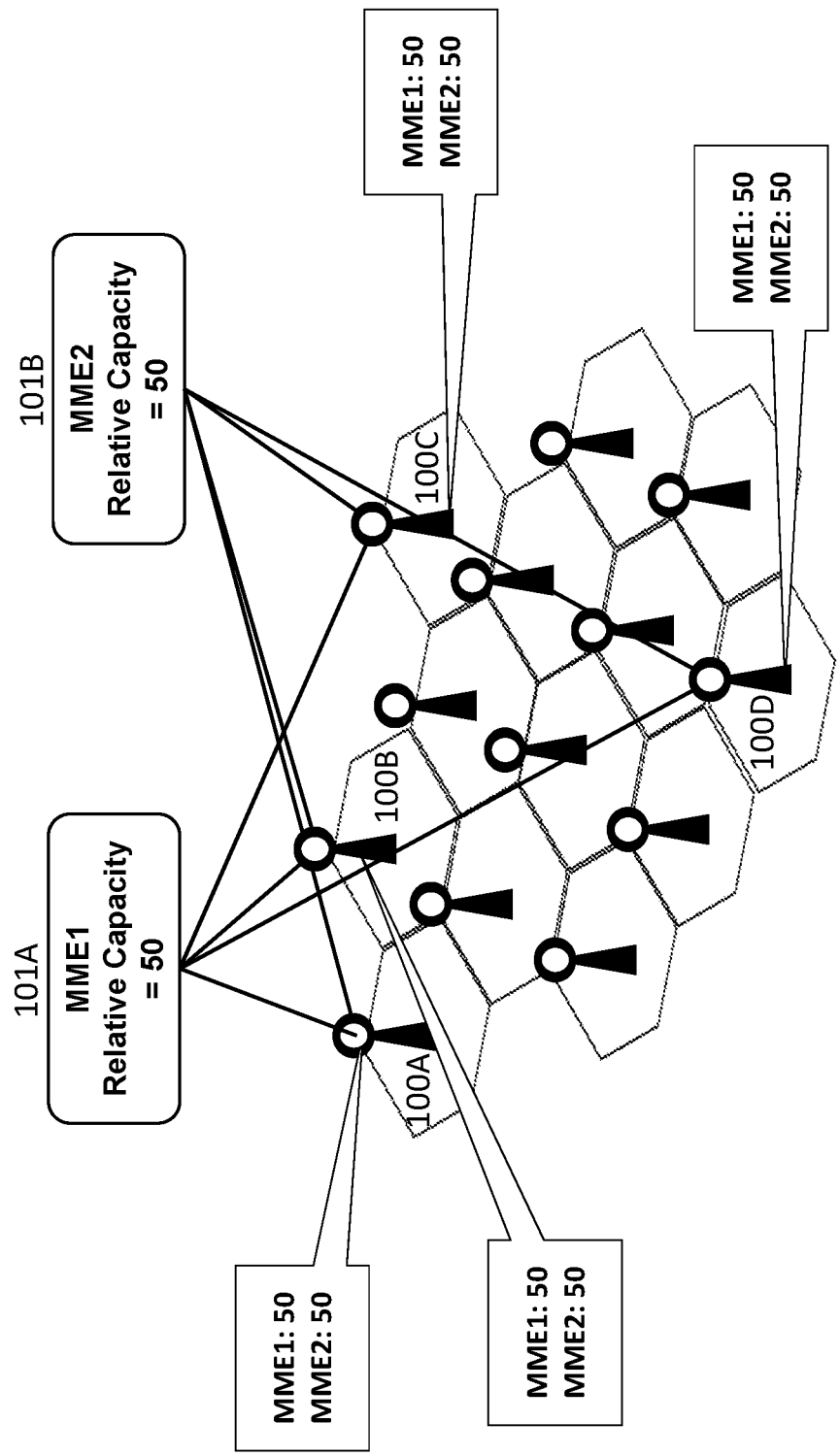
FIG. 1 illustrates a 3GPP-defined implementation of an MME pool.

Some embodiments described herein relate to solving multiple problems in 4G LTE networks and Narrow Band Internet of Things ("NB-IOT") networks. MME pools (e.g., as defined by the 3GPP standard or the 4G LTE standard, or similar elements in future generations) define a set of eNodeBs in a network, each of which is connected to all MMEs in the pool. An advantage of supporting users in the pooled area across multiple MMEs is that it creates a built-in, network-level redundancy (e.g., to compensate for potential MME failures by properly distributing network traffic after a failure).

Existing 3GPP architectures permit many eNodeBs to connect to an MME pool, and load balancing is typically performed on a per MME basis. The eNodeBs perform load balancing based on the MME relative capacity. All the eNodeBs in the pool receive the same relative capacity from an MME in the pool. That works fine in areas where the distance between an MME and an eNodeB is small (the distance is not limited to physical distance between the MME and the eNodeB, it can also mean the number of hops in the network connectivity between the two). However, when covering large geographical areas, latency can become a major problem. Some eNodeBs may be far away from the associated MMES (e.g., in terms of physical distance, number of network hops, or other measures of latency.) Furthermore, the distances between one eNodeB to the MMES in the pool may not be the same. Instead of making all eNodeBs perform load balancing uniformly, embodiments disclosed herein perform load balancing non-uniformly—for MMES that are closer to an eNodeB, a higher relative capacity is assigned. In other words, different relative capacities are assigned as a function of network distance (e.g., geographic distance and/or number of network hops). In so doing, a large majority of eNodeBs that are closer to the MME will use that MME. Such architectures of the present disclosure retain the benefits of the MME pool (e.g., if one MME fails, the UEs on the MME can move to another MME in the pool to ensure continuous service), but also potentially reduce call failure occurrence and/or improve network performance.

In a first example, for a given MME pool, the communication distance in terms of latency between an eNodeB and each of the MMES in the pool can be different. Therefore, it is desirable for the eNodeBs to favor the MMES in a pool based on the distance when distributing mobile subscriber traffic. However, existing 3GPP-defined methods force all eNodeBs in a pool to treat the MMES uniformly (i.e., to regard them as having uniform capacity), regardless of how geographically diverse the eNodeBs are.

In a second example, for a given MME pool, the offloading of subscribers is performed on a per-MME basis. When a particular MME is offloaded, it impacts all of the subscribers on that MME, regardless of where those subscribers are located. In some instances, it is desirable to offload the subscribers on a per eNodeB, per tracking area (TA) or per group of TAs basis, to facilitate geographical based offloading.

Non-Uniform Relative Capacity Assignments in an MME Pool

In previous implementations of an MME pool, each MME is assigned a relative capacity that is defined on a per pool basis. The MME sends the same relative capacity to all the eNodeBs in the pool uniformly. All of the eNodeBs in the pool may perform subscriber distribution based on the relative capacities received from all the MMES in the MME pool. FIG. 1 illustrates one example of a 3GPP defined solution. As shown in FIG. 1, MME1 (101A) and MME2 (102A) have relative capacities of 50 each, and eNodeBs 100A, 100B, 100C and 100D each view MME1 (101A) and MME2 (102A) as having relative capacities of 50 each. A person having ordinary skill in the art would understand that the units of relative capacities may be a percentage or may be based on an arbitrary number or scale. Regardless of the units, capacities may be assigned relative to other eNodeBs.

According to embodiments set forth herein, instead of using a single relative capacity for all the eNodeBs in the pool, the MME uses different relative capacity numbers for different eNodeBs, different tracking area identifiers (TAIs) or different tracking area (TA) groups. The relative capacity can be dynamically determined, for example by an MME or a central processing node in communication with the MMES, based on the latency of the eNodeBs, or can be set administratively based on operator policy on a per eNodeB, per TA or per TA group basis. For example, when an eNodeB performs S1 Setup Request to the MME, the MME may use a relative capacity number that is specific for the eNodeB in the response. According to an embodiment, the MME can determine the average latency between the MME and all the eNodeBs and use these values to determine if an eNodeB should be given higher relative capacity or not. According to an embodiment, when a new eNodeB is setup, the MME can compare the latency of the new eNodeB against the average latency. An eNodeB with latency lower than the average (or alternatively a preset threshold) may receive higher Relative Capacity such that more users on the eNodeB are hosted on the MME that is closer to the eNodeB. If any of the relative capacity is changed, the MME can inform the impacted eNodeB(s) using the MME of the modified relative capacity number via a Configuration Update Request. Accordingly, the Configuration Update Request may be specifically tailored to each eNodeB in the pool.

Figure 2:
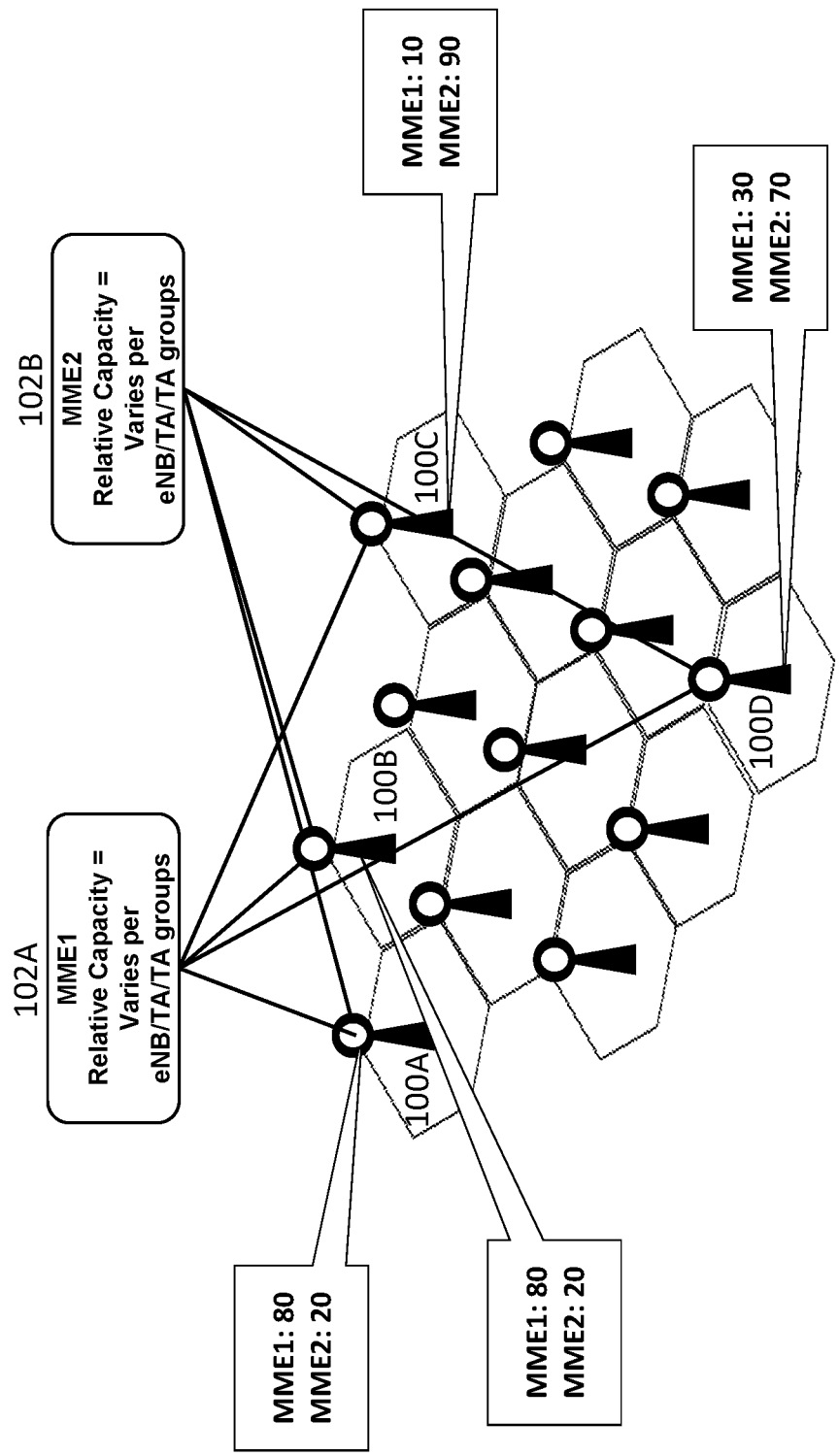
FIG. 2 illustrates non-uniform assignment of MME capacity in an MME pool, in accordance with some embodiments of the disclosed subject matter.

FIG. 2 is an illustration of such an implementation. In contrast with the arrangement of FIG. 1, FIG. 2 shows that MME1 (101B) and MME2 (102B), when applying flexible load management techniques described herein, have capacities that vary according to the eNodeB, TA and/or TA group. Hence, eNodeBs 100A, 100B, 100C and 100D each associate MME1 (101B) and MME2 (102B) with relative capacities that may or may not be the same as one another's. As shown in FIG. 2, eNodeB 100A views MME1 (101B) as having a relative capacity of 80 and MME2 (102B) as having a relative capacity of 20; eNodeB 100B views MME1 (101B) as having a relative capacity of 80 and MME2 (102B) as having a relative capacity of 20; eNodeB 100C views MME1 (101B) as having a relative capacity of 10 and MME2 (102B) as having a relative capacity of 90; and eNodeB 100D views MME1 (101B) as having a relative capacity of 30 and MME2 (102B) as having a relative capacity of 70. These distributions are merely examples, and other distributions are possible depending on the factors described herein. To ensure the user distribution between the MMEs in the pool matches the capacity of the MMEs in the pool, the sum of the relative capacities sent to all the eNodeBs shall preserve the capacity ratio. In this example, MME1 and MME2 have the same capacity, therefore, the following formula may be observed:

Σ Relative Capacity sent to each eNodeB in the pool by MME1=Σ Relative Capacity sent to each eNodeB in the pool by MME2

Stated another way, load balancing ensures that the total number of subscribers serviced by a given MME (of a plurality of available MMEs) is proportional to that MME's capacity. If two MMEs are of the same capacity, as shown in FIG. 2, their capacity sums will match. According to this example, the load will always be balanced between MME1 and MME2. If one MME has twice as much capacity as another MME, then the ratio of their capacity sums will be 1:2 in favor of the larger MME. In practice, load balancing of either of these types is more complex because the number of users is constantly changing, and some eNodeBs are busier than others. Therefore, MMEs may assign relative capacity numbers such that the load may be balanced over time. For example, MMEs may use historical data to adjust how much capacity is given to eNodeBs given historical trends. According to another embodiment, the MMEs may communicate in real time regarding the actual load on the network, and adjust relative capacities to balance the load. According to another embodiment, MMEs exchange load information with a centralized node in order to better balance the load. As discussed above, in previous architectures, when eNodeBs connect to an MME, the MME would use a single configured value as the relative capacity for all the eNodeBs. According to methods described herein, however, an MME can use different relative capacity values for different eNodeBs. The values can either be configured on a per eNodeB, per tracking area (TA) or per group of tracking areas (TA group) basis or automatically determined based on communication latency between the MME and the eNodeB.

Figure 3:
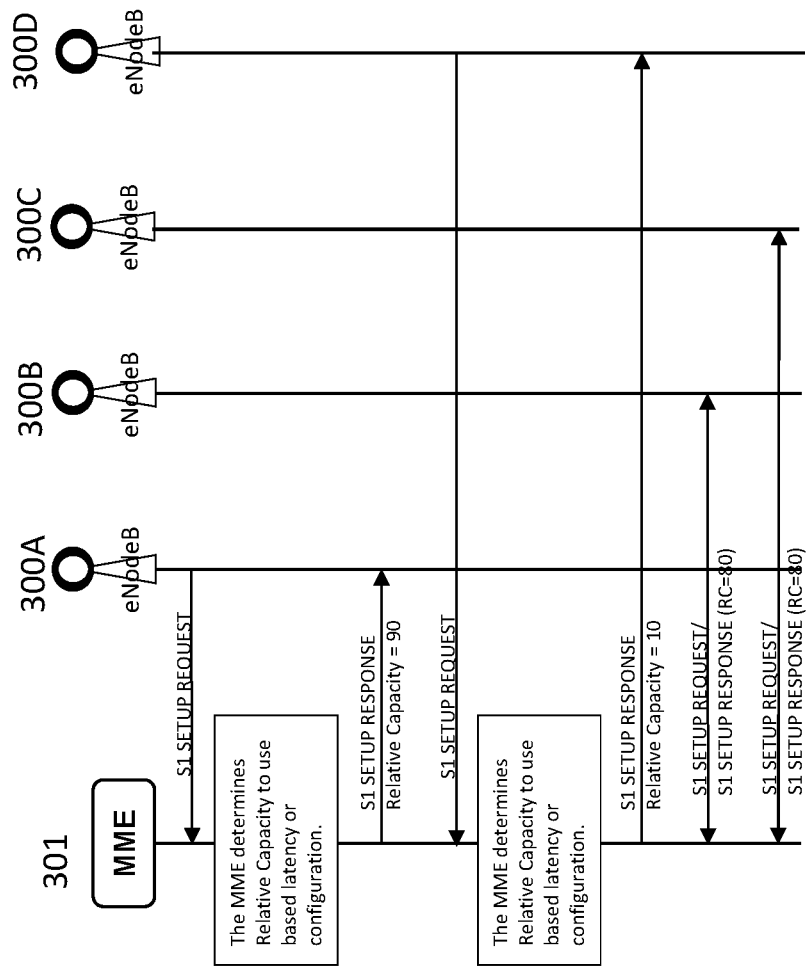
FIG. 3 is a data flow of an initial eNodeB setup with non-uniform relative capacity, in accordance with some embodiments of the disclosed subject matter.

For example, FIG. 3 shows the message flow when an MME 301 with the non-uniform relative capacity capability is introduced, in accordance with some embodiments of the disclosed subject matter. As shown in FIG. 3, an initial eNodeB setup can begin, at step (1), with an S1 Setup Request sent from eNodeB 300A to MME 301. The MME 301 then determines, at step (2), a relative capacity to use based on latency and/or operator configuration. At step (3), MME 301 sends an S1 Setup Response (indicating a relative capacity of 90, for example) back to eNodeB 300A. Similarly, at step (4), an S1 Setup Request is sent from eNodeB 300D to MME 301. The MME 301 then determines, at step (5), a relative capacity to use based on latency and/or configuration. At step (6), MME 301 sends an S1 Setup Response (indicating a relative capacity of 10, for example) back to eNodeB 300D. At step (7), an S1 Setup Request is sent from eNodeB 300B to MME 301, and MME 301 sends an S1 Setup Response (indicating a relative capacity of 80, for example) back to eNodeB 300B. At step (8), an S1 Setup Request is sent from eNodeB 300C to MME 301, and MME 301 sends an S1 Setup Response (indicating a relative capacity of 80, for example) back to eNodeB 300C. Note that, for steps (7) and (8), the same processing can be performed by the MME as in step (2).

As discussed above, example relative capacity values may be assigned on a per-eNodeB basis. According to an embodiment, these values may be set by a network operator. Such values may be chosen to provide desired operational characteristics, for example, for particular geographic regions. According to another embodiment, these values may be set automatically. Automated setting of relative capacity values may be based, for example, upon a threshold latency value or distance. If a latency or distance between an MME and an eNodeB is above a certain threshold, a specified minimum relative capacity may be assigned. According to an embodiment, the relative capacity may be automatically assigned based on the amount that latency or distances exceeds the threshold. According to another embodiment, a centralized node may receive latency information from each MME and coordinate relative capacity for all eNodeBs and MMES across the MME pool in order to maximize network performance. According to some embodiments, relative capacity may be assigned to optimize other network characteristics, such as feature parity between MMES and eNodeBs.

The non-uniform assignment of relative MME capacity can allow an operator to manage subscriber distribution at a much more granular level than in previous methods. For example, using a latency-based Relative Capacity setting, a majority of subscribers can use the MME closer to where they are. The overall quality of experience for subscribers can therefore be enhanced due to reduced latency.

Figure 4:
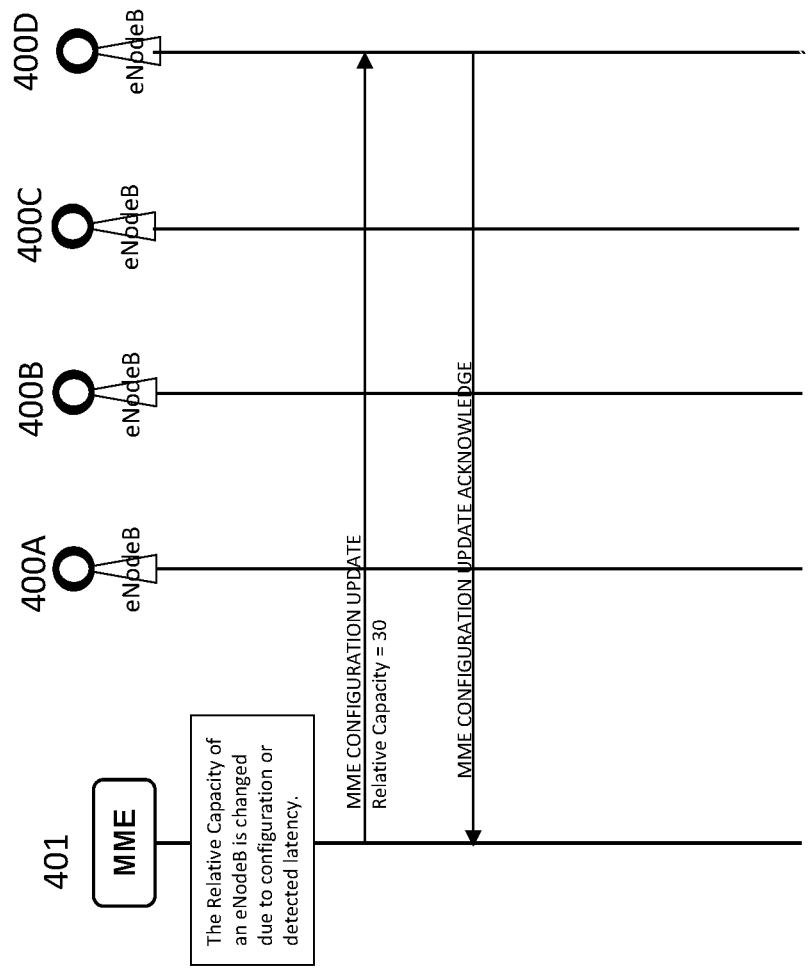
FIG. 4 is a data flow of a relative capacity change for one eNodeB, in accordance with some embodiments of the disclosed subject matter.

FIG. 4 is a data flow of a relative capacity change for one eNodeB (or TA or TA group), in accordance with some embodiments of the disclosed subject matter. The relative capacity change can be accomplished, for example, via network operator/carrier configuration or algorithmically by the MME 401. Specifically, FIG. 4 shows the message flow which begins when an MME 401 determines that the relative capacity for one of the eNodeBs 400A, 400B, 400C, 400D (e.g., eNodeB 400D) needs to be changed or has been changed (see step (1)). In such instances, MME 401 sends an MME Configuration Update message (step (2)) containing a new relative capacity (e.g., 30) to the eNodeB 400D. The eNodeB 400D, in turn, responds with MME Configuration Update Acknowledge message (step (3)).

"Per-eNodeB," "Per TA" or "Per TA Group" Offloading

Traditionally, during the de-loading (or "offloading") of an MME, in which a subscriber is moved from one MME to another (e.g., for maintenance or upgrade), all subscribers will move from that MME uniformly because of the relative capacity. In other words, the offloading procedure is applied to all the eNodeBs connected to the MME. By contrast, according to some embodiments set forth herein, UE offloading between MMEs in the pool can be performed on a per eNodeB, per TA or per TA group basis. In some embodiments, an operator can control the area to which offloading shall be applied. In other words, a "partial offloading" can be performed, for example as a part of load balancing.

In some implementations, to offload subscribers on a geographical area basis, the relative capacity of the MME to be offloaded can be reduced to 0 for the eNodeBs in the geographical area. At the same time, the relative capacity of the other MMES in the pool can be adjusted according to a desired load distribution. In other words, some MMEs in a given MME pool can be "prioritized" over other MMES in the MME pool. The change can be realized, for example, using the MME Configuration Update Request. In addition, the MME being offloaded can begin the offloading procedure for the subscribers in the geographical area only.

According to some embodiments, these types of offloading may be directed by a network operator. An operator may choose to do so, for example, for all user equipment (UE) associated with an MME to take that MME out of service for an update or maintenance. According to another embodiment, an operator may choose to offload a subset of UE associated with a particular geographic region, for example, for load balancing purposes.

According to another embodiment, the offloading may be automated according to a set of rules. For example, MMES in an MME pool may compare the number of users assigned to each MME in order to determine if the variance of the load on the MMES is within a preset threshold (e.g., based on a comparison of max-min, or other known methods of determining variation among various values). If the threshold is exceeded, MMES with more traffic may offload users to other MMES, for example those with less traffic until the variance falls below the threshold. This may be directed by a central node, or may be accomplished via inter-MME communications.

In some embodiments, "capacity" is defined by an 8-bit number in the range from 0 to 255, and its usage can be implementation-dependent. Other methods of encoding capacity are contemplated, such as different numbers. Each eNodeB receives relative capacity from the MMES in the pool, and assigns traffic proportionally for to the MMES from which it has received a relative capacity. For example, if an eNodeB receives 10 units from MME1 and 20 units from MME2, it will send ⅓ of all traffic to MME1 and ⅔ of all traffic to MME2. Accordingly, each eNodeB may be blind to the total capacity assigned by each MME as well as the capacity assigned to other eNodeB s.

Figure 5:
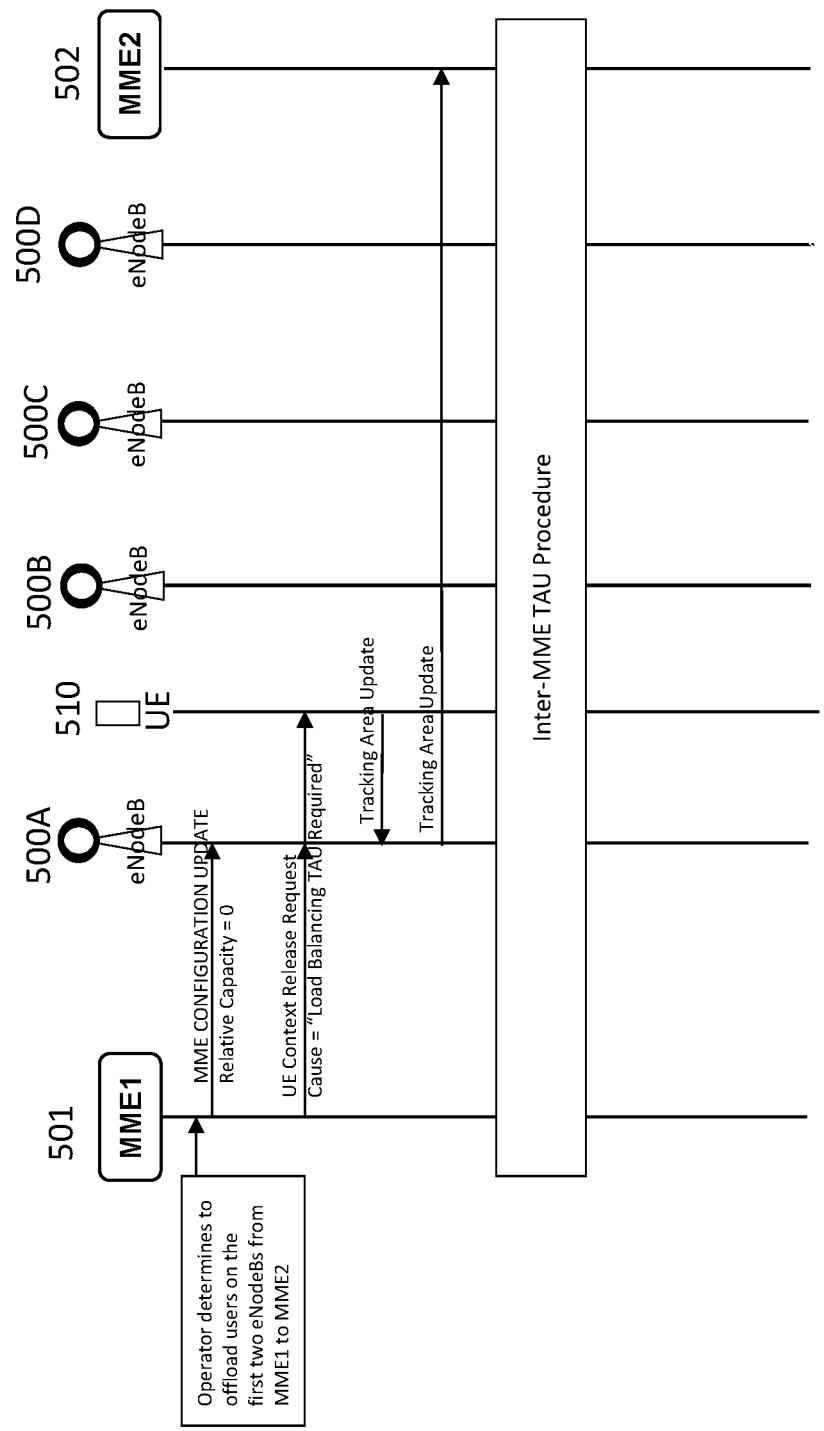
FIG. 5 is a data flow of an offloading process based on geographic area, in accordance with some embodiments of the disclosed subject matter.

To illustrate, FIG. 5 shows a message flow when offloading is performed for one eNodeB, in accordance with some embodiments of the disclosed subject matter. As shown in FIG. 5, at step (1), an operator decides to move UE 510 on the first eNodeB that are currently attached to MME1 (501), to MME2 (505). At step (2), a relative capacity for the first eNodeB (500A) is set to 0, via an MME Configuration Update, to stop new users from attaching to MME1. The eNodeB, in turn (at step (3)), acknowledges the MME via an MME Configuration Update Acknowledge message. At step (4), the MME 501 releases the S1 connection with the UE 510 via a UE Context Release Request specifying a cause of "Load Balancing TAU Required." Optionally, if the UE 510 is not active at the time that the connection is released, the MME 501 can "page" the UE 510 to make it active. The UE 510 performs a "tracking area update" (TAU) (at step (5)) after the S1 connection is released by sending a tracking area update message to eNodeB 500A. At step (6), the eNodeB 500A selects MME2 (505) to process the Tracking Area Update by sending a tracking area update message. Subsequently, at step (7), the rest of the inter-MME TAU procedure is performed to complete the movement of UE 510 from MME1 (501) to MME2 (505). Inter-MME TAU procedure allows MME2 (505) to receive UE 510's state information from MME1 (501).

Figure 6:
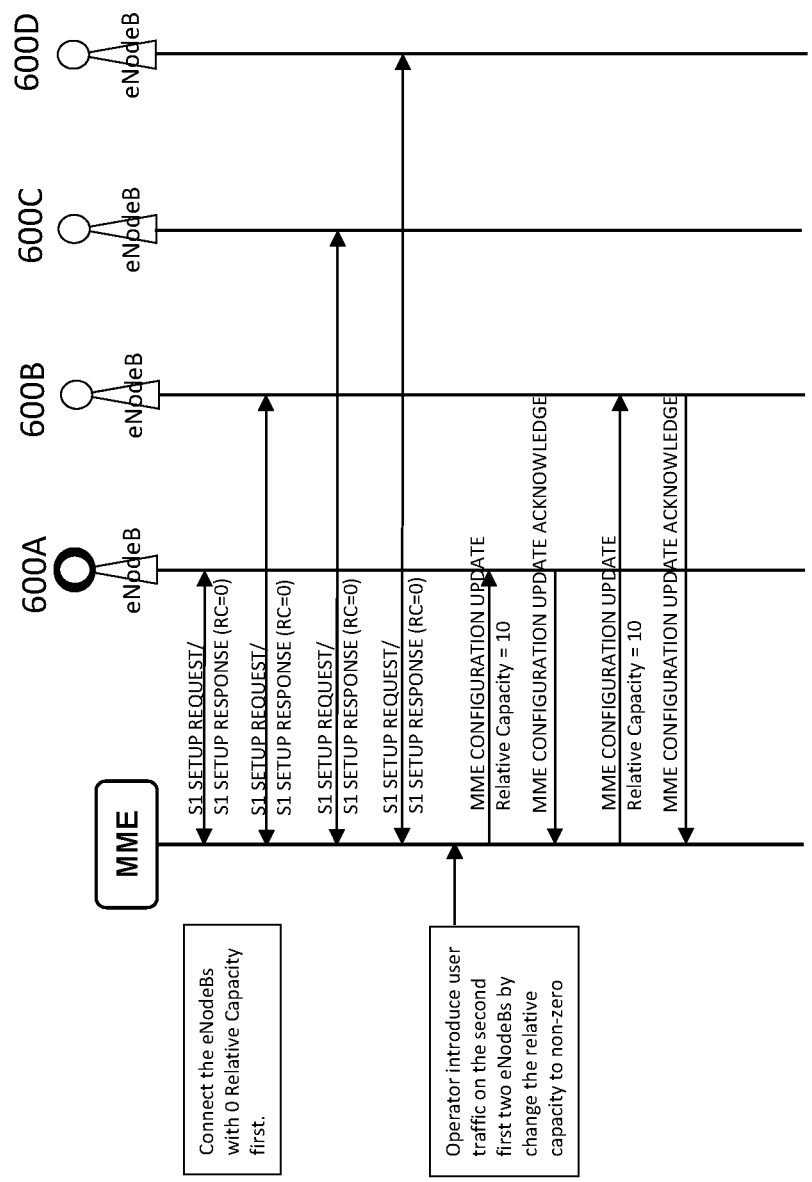
FIG. 6 is a data flow of a controlled introduction of user traffic, in accordance with some embodiments of the disclosed subject matter.

In traditional configurations, if an operator wanted to use an MME for only a subset of a given coverage area, the operator had to control the setting(s) of the eNodeBs to ensure that only a subset of the eNodeBs were connected to the MME. By contrast, according to methods set forth herein, an operator can allow all the eNodeBs to connect first, then turn on user traffic one eNodeB, one TA or TA group at a time (i.e., based on tracking area information received from each eNodeB in response to the S1 Setup Request message). Initializing all eNodeBs and then turning on traffic in small groupings allows for a new MME to be field-tested without effecting a significant amount of user traffic, or allows for a new MME to be dedicated to a particular geographic region that has or expects an increased level of activity. For example, FIG. 6 shows a message flow during a controlled introduction of user traffic, in accordance with some embodiments of the disclosed subject matter. As shown in FIG. 6, at step (1), an operator sets the relative capacity to 0 globally for all connected eNodeBs. As such, at step (2), all four of the eNodeBs (600A, 600B, 600C and 600D) connect to the MME 601, with relative capacities of 0. The eNodeBs (600A, 600B, 600C and 600D) will therefore continue to route UE traffic to other MMES in the pool. The operator can then decide, at step (3), to open up traffic to the first two eNodeBs (600A and 600B). The operator sets the Relative Capacity to 10. At step (4), the MME sends an MME CONFIGURATION UPDATE message, indicating a relative capacity of 10, to the first eNodeB (600A). The eNodeB (600A) responds, in turn, with an MME CONFIGURATION UPDATE ACKNOWLEDGE message (step (5)). At this point, the eNodeB (600A) can send user traffic to the MME (601). Steps (4) and (5) are repeated (as steps (6) and (7), respectively) for the second eNodeB (600B).

Methods described herein can also apply to a Cellular IoT ("CIoT") Serving Gateway Node ("C-SGN," as defined by 3GPP TS23.401) pool in a NB-IOT network. Although the techniques and systems disclosed herein have been discussed in relation to 3G and 4G network architectures, a person having ordinary skill in the art would understand that these techniques and systems could be easily applied to future generations of network architectures. For example, in 5G, the techniques described herein may be accomplished using the equivalent structures of eNodeBs and/or MMEs, such as next generation NodeBs (gNodeBs or gNBs) and/or access mobility functions (AMFs), respectively.

Although shown and described herein as being stationary/fixed (e.g., cell towers), in some implementations, an eNodeB can be mobile (e.g., mounted on a vehicle).

The techniques and systems disclosed herein may be implemented as a computer program product for use with a network, computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a network, computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

In the foregoing description, certain steps or processes can be performed on particular servers or as part of a particular engine. These descriptions are merely illustrative, as the specific steps can be performed on various hardware devices, including, but not limited to, server systems and/or mobile devices. Alternatively or in addition, any or all of the steps described herein can be performed on a virtualized machine that runs on a physical server itself. Similarly, the division of where the particular steps are performed can vary, it being understood that no division or a different division is within the scope of the invention. Moreover, the use of "module" and/or other terms used to describe computer system processing is intended to be interchangeable and to represent logic or circuitry in which the functionality can be executed.

The invention claimed is:

1. A method of assigning resources to eNodeBs in a mobility management entity (MME) pool, comprising:
    determining a first relative capacity for a first eNodeB based on at least one of latency between the first eNodeB and a first MME and a location of the first eNodeB, wherein the first relative capacity is associated with a first relative capacity value being greater than zero;
    determining a second relative capacity for a second eNodeB based on at least one of latency between the second eNodeB and the first MME and a location of the second eNodeB, wherein the second relative capacity is associated with a second relative capacity value being greater than zero;
    providing the first relative capacity to the first eNodeB in a first configuration update request, wherein a portion of traffic sent from the first eNodeB to the first MME is based on both the first relative capacity and the second relative capacity;
    providing the second relative capacity to the second eNodeB in a second configuration update request, wherein a portion of traffic sent from the second eNodeB to the first MME is based on both the first relative capacity and the second relative capacity;
    determining a third relative capacity for the first eNodeB based on at least one of latency between the first eNodeB and a second MME in a pool with the first MME and the location of the first eNodeB, wherein the third relative capacity is associated with a third relative capacity value being greater than zero; and
    providing the third relative capacity to the first eNodeB in a third configuration update request, wherein a portion of traffic sent from the first eNodeB to the second MME is based on the third relative capacity.

2. The method of claim 1, wherein the first relative capacity value is different from the second relative capacity value.

3. The method of claim 1, further comprising offloading the second eNodeB from the first MME at a first time, wherein the offloading comprises:
    providing a fourth relative capacity to the second eNodeB in a fourth configuration update request, wherein the portion of traffic sent from the second eNodeB to the first MME is reduced to zero based on the fourth relative capacity.

4. The method of claim 3, wherein at the first time, the portion of traffic sent from the first eNodeB to the first MME is greater than zero.

5. The method of claim 1, further comprising:
    determining a fourth relative capacity for the second eNodeB based on at least one of latency between the second eNodeB and the second MME and the location of the second eNodeB, wherein the fourth relative capacity is associated with a fourth relative capacity value being greater than zero; and
    providing the fourth relative capacity to the second eNodeB in a fourth configuration update request, wherein a portion of traffic sent from the second eNodeB to the second MME is based on the fourth relative capacity.

6. The method of claim 5, wherein at least one of:
    the third relative capacity value is different from the fourth relative capacity value;
    the first relative capacity value is different from the third relative capacity value; and
    the second relative capacity value is different from the fourth relative capacity value.

7. A method of assigning resources to eNodeBs in a mobility management entity (MME) pool, comprising:
    determining a first relative capacity for a first eNodeB based on at least one of latency between the first eNodeB and a first MME and a location of the first eNodeB, wherein the first relative capacity is associated with a first relative capacity value being greater than zero;
    determining a second relative capacity for a second eNodeB based on at least one of latency between the second eNodeB and the first MME and a location of the second eNodeB, wherein the second relative capacity is associated with a second relative capacity value being greater than zero;
    providing the first relative capacity to the first eNodeB in a first configuration update request, wherein a portion of traffic sent from the first eNodeB to the first MME is based on the first relative capacity;
    providing the second relative capacity to the second eNodeB in a second configuration update request, wherein a portion of traffic sent from the second eNodeB to the first MME is based on the second relative capacity; and
    providing the second relative capacity to a third eNodeB in a third configuration update request, wherein:
        a portion of traffic sent from the third eNodeB to the first MME is based on the second relative capacity; and
        the third eNodeB being located less than a threshold distance from the second eNodeB.

8. The method of claim 7, wherein the determining of the first relative capacity and the second relative capacity and the providing of the first relative capacity and the second relative capacity are performed by the first MME.

9. The method of claim 8, further comprising:
    receiving, by the first MME, a portion of traffic from the first eNodeB based on the first relative capacity; and
    receiving, by the first MME, a portion of traffic from the second eNodeB based on the second relative capacity.

10. A system for assigning resources to eNodeBs in a mobility management entity (MME) pool, the system comprising:
- a processor; and
- a memory coupled to the processor and including computer-readable instructions that, when executed by the processor, cause the processor to:
  - determine a first relative capacity for a first eNodeB based on at least one of latency between the first eNodeB and a first MME and a location of the first eNodeB, wherein the first relative capacity is associated with a first relative capacity value being greater than zero;
  - determine a second relative capacity for a second eNodeB based on at least one of latency between the second eNodeB and the first MME and a location of the second eNodeB, wherein the second relative capacity is associated with a second relative capacity value being greater than zero;
  - provide the first relative capacity to the first eNodeB in a first configuration update request, wherein a portion of traffic sent from the first eNodeB to the first MME is based on both the first relative capacity and the second relative capacity;
  - provide the second relative capacity to the second eNodeB in a second configuration update request, wherein a portion of traffic sent from the second eNodeB to the first MME is based on both the first relative capacity and the second relative capacity;
  - determine a third relative capacity for the first eNodeB based on at least one of latency between the first eNodeB and a second MME in a pool with the first MME and the location of the first eNodeB, wherein the third relative capacity is associated with a third relative capacity value being greater than zero; and
  - provide the third relative capacity to the first eNodeB in a third configuration update request, wherein a portion of traffic sent from the first eNodeB to the second MME is based on the third relative capacity.

11. The method of claim 10, wherein the first relative capacity value is different from the second relative capacity value.

12. The method of claim 10, wherein the processor is further caused to offload the second eNodeB from the first MME at a first time, wherein the offloading further causes the processor to provide a fourth relative capacity to the second eNodeB in a fourth configuration update request, wherein the portion of traffic sent from the second eNodeB to the first MME is reduced to zero based on the fourth relative capacity.

13. The method of claim 10, wherein the processor is further caused to:
- determine a fourth relative capacity for the second eNodeB based on at least one of latency between the second eNodeB and the second MME and the location of the second eNodeB, wherein the fourth relative capacity is associated with a fourth relative capacity value being greater than zero; and
- provide the fourth relative capacity to the second eNodeB in a fourth configuration update request, wherein a portion of traffic sent from the second eNodeB to the second MME is based on the fourth relative capacity.

14. The method of claim 10, wherein at least one of:
- the third relative capacity value is different from the fourth relative capacity value;
- the first relative capacity value is different from the third relative capacity value; and
- the second relative capacity value is different from the fourth relative capacity value.

15. A system for assigning resources to eNodeBs in a mobility management entity (MME) pool, the system comprising:
- a processor; and
- a memory coupled to the processor and including computer-readable instructions that, when executed by the processor, cause the processor to:
  - determine a first relative capacity for a first eNodeB based on at least one of latency between the first eNodeB and a first MME and a location of the first eNodeB, wherein the first relative capacity is associated with a first relative capacity value being greater than zero;
  - determine a second relative capacity for a second eNodeB based on at least one of latency between the second eNodeB and the first MME and a location of the second eNodeB, wherein the second relative capacity is associated with a second relative capacity value being greater than zero;
  - provide the first relative capacity to the first eNodeB in a first configuration update request, wherein a portion of traffic sent from the first eNodeB to the first MME is based on the first relative capacity; and
  - provide the second relative capacity to the second eNodeB in a second configuration update request, wherein a portion of traffic sent from the second eNodeB to the first MME is based on the second relative capacity;
  - provide the second relative capacity to a third eNodeB in a third configuration update request, wherein:
    - a portion of traffic sent from the third eNodeB to the first MME is based on the second relative capacity; and
    - the third eNodeB being located less than a threshold distance from the second eNodeB.

16. The method of claim 10, wherein the processor is part of the first MME, wherein the first MME is further configured to:
- receive a portion of traffic from the first eNodeB based on the first relative capacity; and
- receive a portion of traffic from the second eNodeB based on the second relative capacity.

* * * * *